United States Patent
Lye

(10) Patent No.: US 12,060,546 B2
(45) Date of Patent: Aug. 13, 2024

(54) DEVICES AND METHODS FOR ACCELERATING THE MATURATION OF PRODUCTS IN A CASK

(71) Applicant: Agapitus B. Lye, Gainesville, FL (US)

(72) Inventor: Agapitus B. Lye, Gainesville, FL (US)

( * ) Notice: Subject to any disclaimer, the term of this patent is extended or adjusted under 35 U.S.C. 154(b) by 503 days.

(21) Appl. No.: 17/359,718

(22) Filed: Jun. 28, 2021

(65) Prior Publication Data

US 2022/0411731 A1 Dec. 29, 2022

(51) Int. Cl.
C12H 1/00 (2006.01)
C12H 1/16 (2006.01)
C12H 1/22 (2006.01)

(52) U.S. Cl.
CPC .................. *C12H 1/22* (2013.01); *C12H 1/16* (2013.01)

(58) Field of Classification Search
CPC .. B06B 1/04; B01F 31/57; B65B 1/22; C12H 1/16; C12H 1/22
See application file for complete search history.

(56) References Cited

U.S. PATENT DOCUMENTS

| | | | |
|---|---|---|---|
| 5,860,353 | A | 1/1999 | Ceccarani |
| 9,474,301 | B2 | 10/2016 | Gordon et al. |
| 2008/0000356 | A1 | 1/2008 | Eustis |
| 2008/0190260 | A1* | 8/2008 | Lye .......................... G10D 3/22 84/173 |
| 2010/0062120 | A1 | 3/2010 | Jang et al. |
| 2011/0070331 | A1 | 3/2011 | Watson et al. |
| 2013/0129888 | A1 | 5/2013 | Kornacki |
| 2018/0216055 | A1 | 8/2018 | Maruyama et al. |
| 2020/0071645 | A1 | 3/2020 | Meyer et al. |

FOREIGN PATENT DOCUMENTS

| | | |
|---|---|---|
| EP | 0 477 583 | 3/1997 |
| KR | 10 0793841 | 1/2008 |

OTHER PUBLICATIONS

Tao, Y. et al. "Advances in Wine Aging Technologies for Enhancing Wine Quality and Accelerating Wine Aging Process" *Crit Rev Food Sci Nutr.*, 2014, pp. 1-4, vol. 54, No. 6, abstract only.

* cited by examiner

*Primary Examiner* — Anshu Bhatia
(74) *Attorney, Agent, or Firm* — Saliwanchik, Lloyd & Eisenschenk

(57) ABSTRACT

A cask agitator for accelerating the maturation of a cask product. The cask agitator comprises a vibration generator with a fixedly attached magnet for removable attachment to a cask. One or more vibration extenders can be operably connected to a cask agitator to distribute vibration across a greater area of the cask.

21 Claims, 4 Drawing Sheets

DEVICES AND METHODS FOR ACCELERATING THE MATURATION OF PRODUCTS IN A CASK

BACKGROUND OF INVENTION

Liquor, wine, and other fermented alcohol and non-alcoholic products are often "aged" for several months or even years to "mature" before being consumed. When a product matures it undergoes various changes that can impart desired characteristics. Traditionally, products that benefit from the maturation process are stored in casks. Some products, often wines and sauces, are stored and aged in concrete, stainless steel, or clay vats.

Many liquors and wines are aged in barrels, often made of white oak staves bound with metal barrel hoops. In some industries there are stringent regulations about the size, composition, and shape of the barrels used to age products. In the industry, all barrels are considered to be casks, but not all casks are barrels. A cask can be any size, while a barrel is a specific type of cask with a capacity of 50-53 gallons. American bourbons are usually aged in standard-size barrels, while French cognacs are typically aged in 79-gallon casks.

Enzymes are a vital component in the process of maturing cask products. Most cask products, particularly alcoholic products, are the product of enzymatic transformation. From the pre-fermentation stage, through fermentation, then post-fermentation and while aging, enzymes are the major driving forces catalyzing various biotransformation reactions associated with a mature product.

Because proper maturation of wines and liquors can require years of aging, different methods have been used, to try to accelerate the process. One method has been to provide micro-agitation by subjecting barrels to audible sound, such as music, and various frequencies and amplitudes of vibrations. The object of such experiments has been to agitate or create circulation of the cask product to accelerate the chemical and physical aging processes. The problem with these methods has been getting enough acoustical energy into the cask product to have any appreciable effect and, if sufficient energy is introduced, not to create cavitation in the barrel that can actually slow the aging process or increase the temperature, which can be harmful to the product.

What is needed in the art is a device and method for transmitting vibrations through a cask in a way that mitigates negative effects, while providing the benefits of accelerating the maturation process. It would be further advantageous if such a device did not inhibit how the casks are stored and could remain in place for long periods of time.

BRIEF SUMMARY

In accordance with the embodiments of the invention, the problem of transmitting vibrations through a cask for the purpose of providing agitation to accelerate the maturation of a product therein is solved by a cask agitator that can be directly attached to a metallic component or other metallic area or sidewall of a cask. The ability to attach a cask agitator directly to a cask can facilitate transmission of vibration around and throughout the cask, which can circulate the product to accelerate the maturing process. Advantageously, the embodiments of the subject invention can be attached in such a way that does not affect how the casks must be oriented for storage. Taste tests have shown that when a cask agitator of the subject invention is removably attached to a cask for transmission of vibration therethrough, after sufficient time, the taste of the product is comparable to that of one aged for a longer period without benefit of vibration.

One embodiment of the cask agitator of the subject invention comprises an electric vibration generator with at least one magnet operably connected thereto. The cask agitator can be sized and configured to be removably attached to any metallic component of a cask, which can include, but is not limited to, one or more metallic hoops or a wall of a metallic cask, so as to be in sufficient contact therewith to permit transmission of vibration around and at least partially into the cask product. Thus, embodiments of a cask agitator apparatus of the subject invention are capable of producing vibration in the cask product by attachment to the outside of the cask. Advantageously, cask agitator embodiments of the subject invention are effective at transmitting vibration at frequencies that have been shown to be effective at accelerating the maturing of cask products.

In other embodiments, the subject invention provides methods for accelerating the maturation of wine, liquors, and other products in a cask. One method comprises i) removably attaching a cask agitator to one or more metallic hoops on the outside of a cask, wherein the cask agitator comprises an electric vibration generator with at least one operably connected magnet for removable attachment to the one or more metallic hoops of a cask to affect the product therein, and ii) actuating the cask agitator device so as to generate vibrations that are at least partially transmitted to a product within the cask. Preferably, the cask agitator is capable of operating consistently for at least several months, ideally for at least about 1, 2, or 3 years, or more, while removably attached to a cask. Thus, the apparatuses and methods of the subject invention are able to produce vibration that has a continuous or an intermittent frequency that accelerates maturing of the cask product. The apparatuses and methods can also produce variable vibration such that, for example, the frequency changes over time.

Another embodiment of the invention is a cask agitator device comprising a vibration generator with an operably connected fastener. The fastener can be used to removably attach the vibration generator to a cask. In one embodiment, the fastener can attach a vibration generator to the chime of a cask, which is the beveled edge around the top and bottom of a cask formed by the ends of the cask staves. Typically, a metallic "head" hoop surrounds the chime at each end of the cask to secure the barrel staves. In a further embodiment, the fastener has a magnet or magnetic portion operably attached thereto that contacts the head hoop to improve contact and transmission of vibration around and through the cask.

In still another embodiment, the subject invention provides a method for accelerating the maturation of wine, liquor, or other products aged in a cask by removably attaching a cask agitator to a cask, such as, for example, to one or both chimes. The method comprises i) removably attaching to the chime a cask agitator, which comprises an electric vibration generator operably attached to a fastener, optionally further comprising a magnet or magnetic portion for removably contacting a head hoop around the chime, and ii) actuating the cask agitator so as to generate vibration in, on, and around the cask. Preferably, a cask agitator is capable of consistently operating for several months or years while in contact with a cask. Thus, the devices and methods of the subject invention are capable of producing vibration in, on, and around a cask to accelerate maturing of the cask product therein.

These and other embodiments, advantages, and features of the subject invention will be made apparent from the following description, accompanying drawings, and appended claims.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference or implied reference to dimensions in the drawings or the following description is specific to the embodiments disclosed. Any variations of these dimensions that will allow the subject invention to function for its intended purpose are considered within the scope of the subject invention.

DETAILED DISCLOSURE

Figure 1:
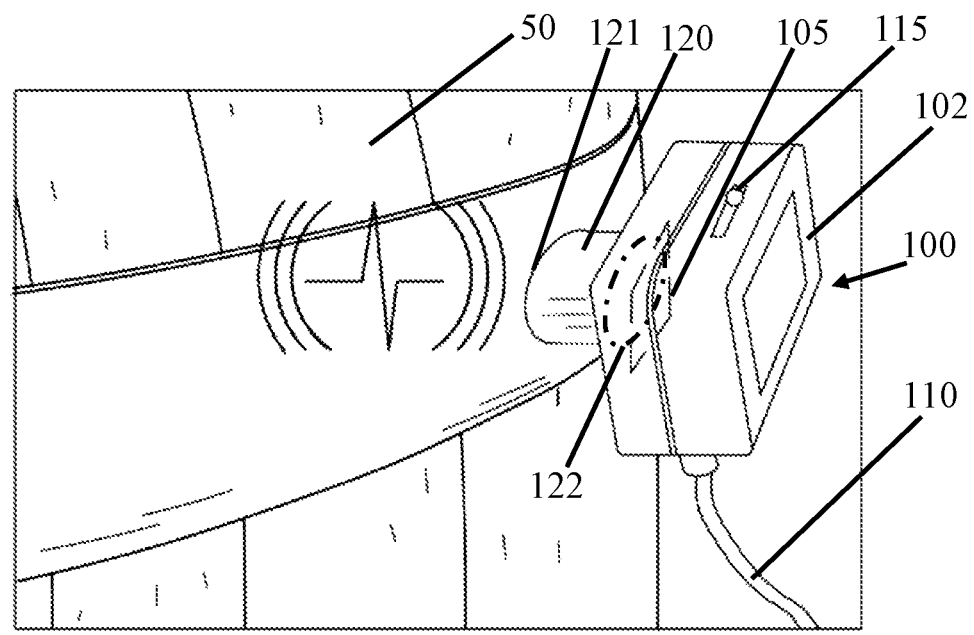
FIG. 1 is an illustration of one embodiment of a cask agitator having a fixedly attached magnet and shown removably attached to a metallic hoop of a cask.

The subject invention provides devices and methods for accelerating the processes that occur in casks while wine, liquor, and other products are maturing.

As products age in casks, they undergo catalytic and other chemical processes that "mature" the product, to improve taste, consistency, color, and other characteristics. Maturing of a product by current methods often requires several months or years of aging within a cask to achieve optimum results. The subject invention provide devices and methods for accelerating the maturing process by transmitting vibration through the cask to agitate or circulate the product.

More specifically, the subject invention provides one or more embodiments of cask agitators that can be removably attached directly to casks to constantly or intermittently transmit vibration therethrough. A cask agitator can create agitation for months or years that circulates the product to facilitate and accelerate the catalytic and other chemical changes that occur during maturation of a product. A cask agitator can provide any frequency of vibration and the vibration can be at least one of continuous, intermittent, and variable in frequency vibration, such that the frequency changes over time.

The subject invention is particularly useful for aging wines and liquors. While the subject application describes, and many of the terms herein relate to advantageous use with alcoholic beverages, it will be apparent to a person with skill in the art and having benefit of the subject disclosure that other alcoholic and non-alcoholic products, such as, for example, beer, vinegars, and fermented condiments and sauces, could also benefit from the devices and methods and are contemplated to be within the scope of the present invention.

In the description that follows, terms are used in relation to the production and maturing of alcoholic beverages and other products. In order to provide a clear and consistent understanding of the specification and claims, including the scope to be given such terms, the following definitions are provided.

The term "cask product" refers to any alcoholic or non-alcoholic drink, food product, non-food product, and other products that are "aged" in a cask to allow the cask product to mature, wherein one or more changes or alterations occur to impart one or more of flavor, odor, color, consistency, alcohol content, acidity, and any other characteristic to the cask product.

The term "cask" refers to any container in which a cask product is aged so as to mature. This can include, but is not limited to, wooden barrels; stainless steel vats; clay vats; glass jars and bottles; and other sealable containers.

The terms "about" or "approximately," as used herein, are defined as at least close to a given value or either end of a range as is necessary to cover manufacturing variances, equipment tolerances, and normal variances in material, as understood by those skilled in the art.

Also, as used herein, and unless otherwise specifically stated, the terms "operable communication," "operable connection," "operably connected," "cooperatively engaged," and grammatical variations thereof mean that the particular elements are connected in such a way that they cooperate to achieve their intended function or functions. The "connection" or "engagement" may be direct, or indirect, physical, or remote.

The figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

Reference will be made to the attached Figures on which the same reference numerals are used throughout to indicate the same or similar components. With reference to the attached FIGS. 1-6, it can be seen that embodiments of the subject invention comprise a cask agitator 100 that can be removably attached to a cask 50. A cask agitator can include an electric vibration generator 102 configured to accept electric current from any of a variety of power sources 20 including, but not limited to, 60 Hz alternating current, a battery, a standard 120V wall outlet, and any other suitable electric source. An external source of electric current can be more advantageous for particular embodiments to ensure long term, uninterrupted operation application of vibrations.

One or more batteries with sufficient energy could also be used, particularly one capable of providing energy for several weeks or months.

Figure 2:
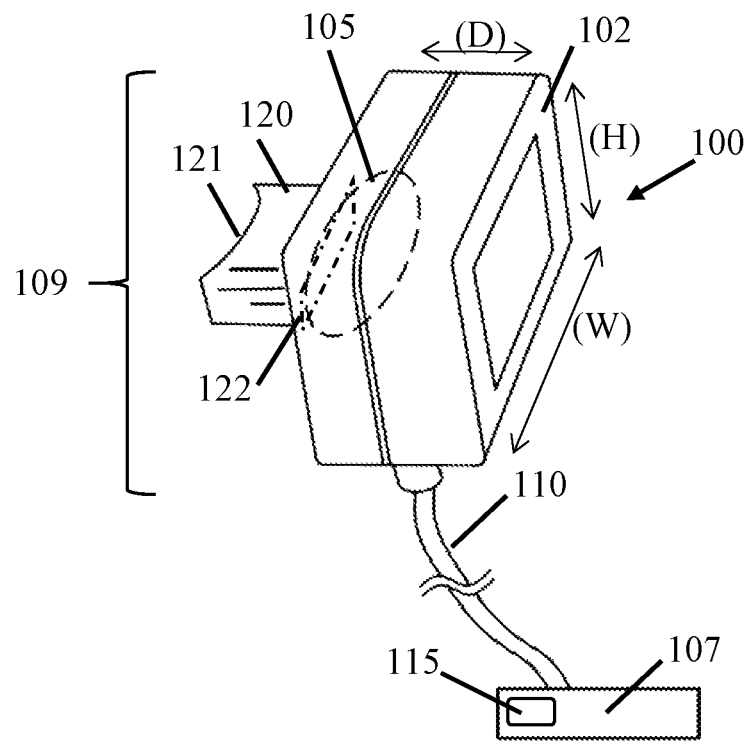
FIG. 2 is an illustration of another embodiment of a cask agitator having a fixedly attached magnet with a curved contact surface for maximizing removeable attachment to a metallic hoop of a cask or other metallic component of a container for aging wine or liquor.
Figure 3:
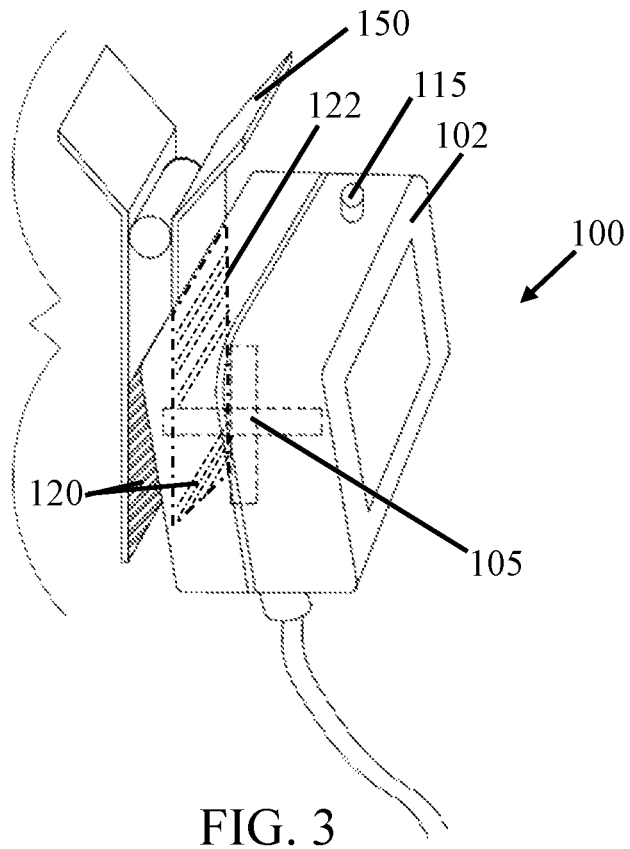
FIG. 3 is an illustration of another embodiment of a cask agitator having a fastener for removeable attachment to the chime to another component of a cask.
Figure 4:
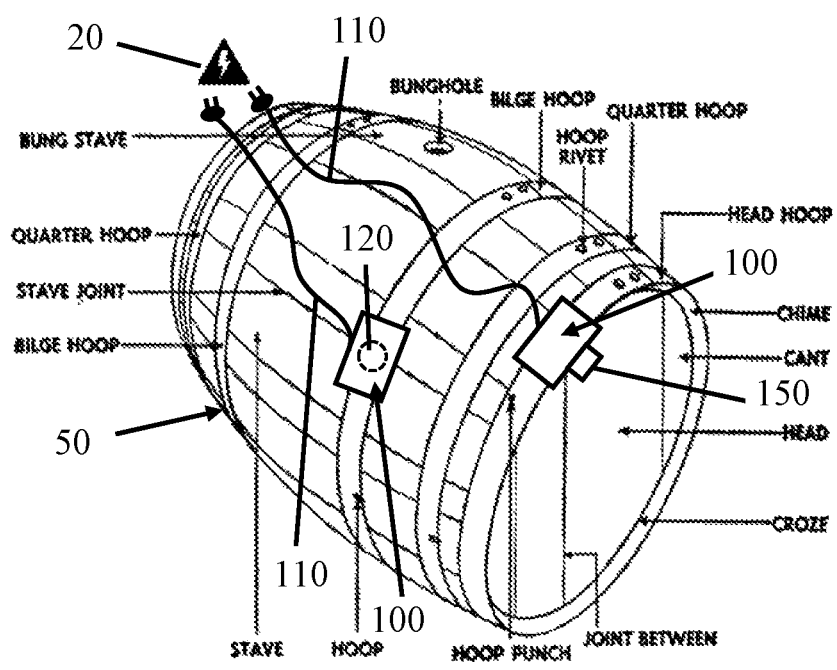
FIG. 4 is an illustration of the typical components of a barrel cask to which are attached embodiments of the cask agitator of the subject invention.
Figure 5:
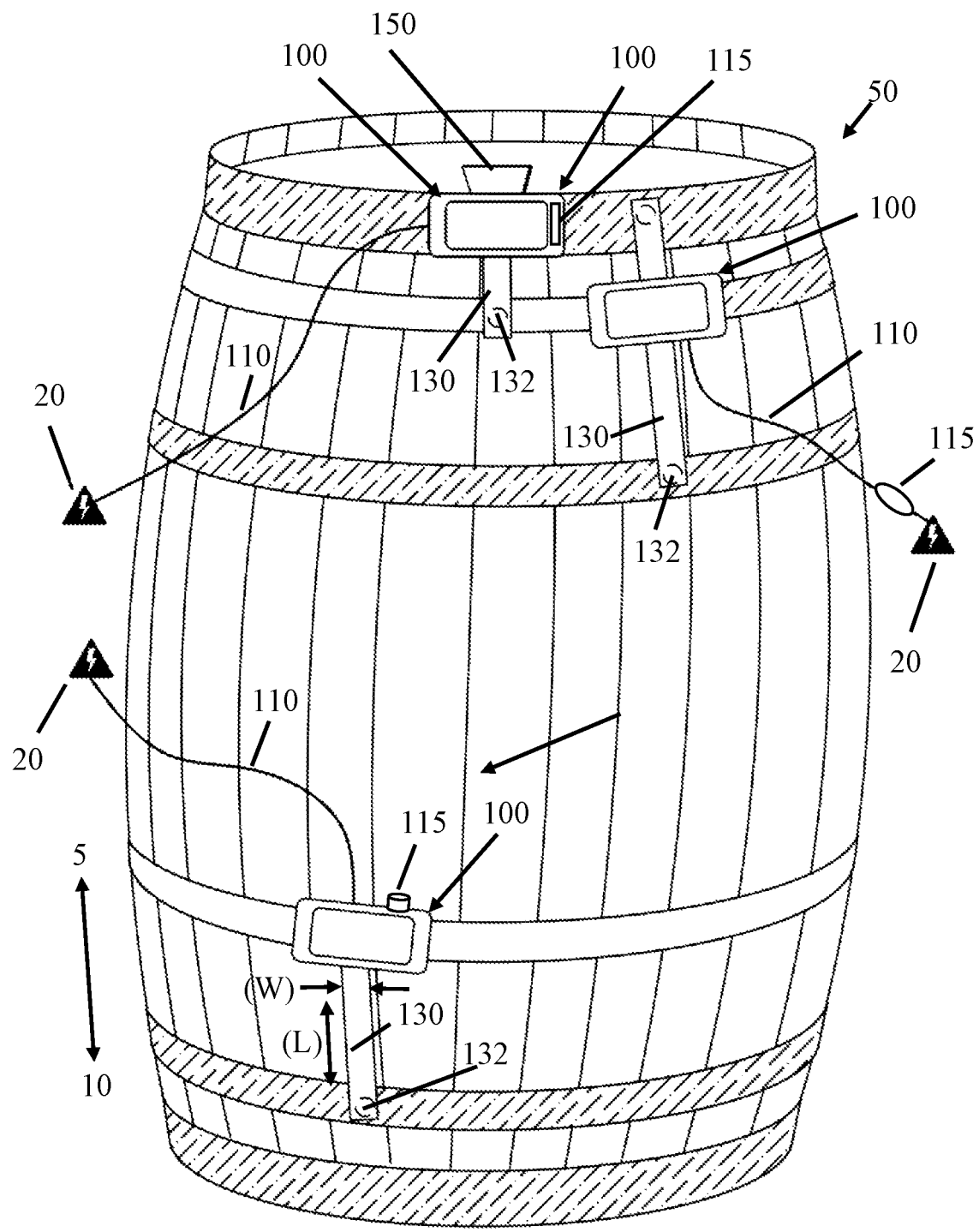
FIG. 5 is an illustration of a barrel-type cask on which multiple vibration generators have been removably attaching to be in contact with more than one hoop by utilizing vibration extenders.

In one embodiment, the power source is connected to the electric vibration generator 102 of a cask agitator 100 via one or more wires or cords 110, so the power source is not in contact with the cask. In another embodiment, a power switch 115 can be used to control power to the electric vibration generator. FIG. 2 illustrates an embodiment of a cask agitator with a battery compartment 107 for containing at least one battery. FIGS. 4 and 5 illustrate non-limiting embodiments of cask agitators with vibration generators that utilize an external source of electric current.

The vibrations of the electric vibration generator 102 can be generated using any of a variety of mechanisms that, while not shown in the Figures, are known in the art, including for example linear vibrators, rotary vibrators, and electromagnetic vibrators, which employ an electromagnet coupled to a permanent magnet on an arm (in which the permanent magnet rotates as a result of the current that flows through the electromagnet, creating vibration), and the like. Preferably, the generated vibration is capable of agitating a cask product to create at least some circulation, agitation, or other movement of the product within the cask. While any suitable power source 20 can be used, particular embodiments employ electrical power, especially AC electrical current. In one particular embodiment, the vibration generator is an electromagnetic vibrator connectable to a source of AC electric current. In another embodiment, the vibration generator is an offset DC motor.

The frequency of vibration that can be beneficial for accelerating the maturing of cask products can depend on a variety of factors, including the size and type of cask. Many vibration frequencies are capable of producing agitation in a cask, but certain frequencies can be more readily transmitted through a particular cask and cask product.

In a preferred embodiment, the cask agitator produces subsonic frequencies. Such frequencies accelerate the maturing of cask products and are usually not irritating or uncomfortable for most people in the vicinity. Higher frequencies can also be utilized and on certain casks may be less irritating.

In one embodiment, a vibration generator produces vibration having a frequency between approximately 30 Hz and approximately 3500 Hz. In a further embodiment, a vibration generator produces vibration having a frequency of between approximately 50 Hz and approximately 2500 Hz. In a still further embodiment, a vibration generator produces vibration having a frequency of between approximately 75 Hz and approximately 1000 Hz. In specific embodiment, a vibration generator produces vibration having a frequency of less than approximately 100 Hz.

A cask can comprise metallic components. For example, casks comprising wooden staves, as shown in FIG. 4, can have multiple hoops arranged around the periphery to secure the staves. Typically, the hoops comprise steel, iron, or other ferromagnetic materials. The cask staves extend towards each end of the cask to form a raised lip or chime at one or both ends of the cask that are secured with a "head" hoop, as shown, for example, in FIG. 4. Steel vats are also used to store and age some products, as are clay vats, glass vats, and other materials, which can have one or more metallic components.

In one embodiment, a cask agitator is configured with at least one magnet 120. The magnet can be arranged in any location where there is a metallic component on the cask agitator. In one embodiment, the magnet has a receiving end 122 that is operably attached to the vibration generator 102 and is preferably positioned in proximity to the vibrating mechanism 105 therein, such as shown, for example, in FIGS. 1, 2, and 3. In a further embodiment, the at least one magnet operably and removably attaches the cask agitator 100 to a metallic component of a cask, such as, for example, at least one metallic hoop, which is shown, by way of example, in FIGS. 1 and 4.

In a particular embodiment, the magnet has a contact surface 121 that makes contact with or touches the hoop or other metallic component of the cask and a receiving end 122 that contacts the vibration generator and receives the vibrations therefrom. A contact surface can have any configuration that enhances, maximizes, or otherwise facilitates the transmission of vibration from the vibration generator 102 to the cask. By way of non-limiting example, a contact surface can be any one or more of flat, curved, bent, angled, ridged, cupped, stippled, or have any other shape or contour for contacting a cask. FIG. 2 illustrates one embodiment of a cask agitator having a magnet 120 with a curved contact surface 121 to facilitate contact with a barrel hoop.

The use of a magnet 120 to removably attach a cask agitator 100 in operable contact with a cask 50 has the advantage of being removably attachable to a cask and also effectively transmitting vibration from the vibration generator 102 to, and throughout, a cask.

Vibration creates agitation in the cask and cask product that creates or increases circulation within the cask and accelerates the catalytic and other process related to maturing by increasing contact of the cask product with enzymes, the cask and/or other materials or substances in the cask. Attaching a cask agitator to a metallic component can create a bell-like effect where vibrations can travel through the metallic component. Where the metallic component is a hoop on a barrel cask, the vibrations can carry around the hoop and into the barrel. Where the cask is a steel vat, the vibrations can carry through and across a larger area of the vat surface and into the vat. Other types of casks, such as clay or glass vats, jars, or bottles often have metallic components to which a cask agitator 100 can be removably attached to create the same or similar effect of transmitting vibrations further around and into the cask.

There can be any of a variety of magnets that can be used to fixedly attach a vibration generator 102 to a cask 50. It can be advantageous for the magnet not to interfere with the operation of the vibration generator. There can also be more than one magnet utilized to removably attach a vibration generator to a cask. The number of magnets 120 utilized can depend on several factors, including, for example, the dimensions and weight of the vibration generator where the cask agitator will be attached to the cask, the intensity of the vibrations generated, and other factors understood by those with skill in the art.

In a specific embodiment, the magnet utilized to removably attach a cask agitator to a cask is a N52 Neodymium magnet. In a further embodiment, the magnet is approximately 1.25" in diameter and approximately 0.125" thick and has a pull force of approximately 19 lbs. The same or a different type and size of magnet could be used as an extender magnet 132 to removably attach the distal end 10 of a vibration extender to a cask.

In some situations, the use of a magnet alone to removably attach a cask agitator may not be preferred. In one alternative embodiment, a fastener 150 is used to operably and removably attach a cask agitator to a cask 50. A fastener can be any of a variety of mechanical devices that operably and removably attaches a vibration generator 100 to a cask, including, but not limited to, clips, clamps, braces, vices, brackets, clasps, hooks, buckles, or similar types of apparatuses. A cask 50 comprising a barrel with staves and hoops typically has a chime, which is a lip or beveled edge at each end of the cask where the staves are secured with a head hoop, examples of which are shown in FIGS. 4 and 5. In one embodiment, shown in FIG. 5, a fastener 150 can be used to removably attach a cask agitator 100 to the chime and/or in contact with the head hoop around the chime. In a further embodiment, a fastener, or some portion thereof, is configured with at least one magnet 120 to facilitate attachment of the cask agitator 100 and maximize contact with the chime hoop and transmission of vibration to and through at least a portion of the cask.

Typically, the maturing of cask products can be accelerated with a single cask agitator 100 that can provide sufficient circulation in a cask. Larger casks and some cask products can benefit by having more than one operably connected cask agitator to accelerate maturing of the cask product. For example, the use of two, three, or more cask agitators can be beneficial for creating sufficient or additional circulation in larger casks. In one embodiment, more than one cask agitator 100 is removably attached to a cask to increase the amount of vibration transmitted through a cask and into the cask product. FIG. 4 shows one example of a cask with more than one cask agitator removably attached to a chime and a hoop of a cask. The one or more embodiments of cask agitators could be attached to anywhere on a cask that would increase agitation of the cask product in a manner to accelerate maturing of the cask product.

While multiple cask agitators can be used to provide vibration over a larger area of a cask, it can also be beneficial to distribute the vibration of one or more cask agitators removably attached to a cask. As discussed above, the use of one or more magnets to removably attach a cask agitator to a metallic portion or hoop of a cask has been shown to have an unexpected advantage of increasing contact and distributing vibration over a larger area of the cask and through at least some of the cask product.

In another embodiment, a cask agitator 100 has one or more vibration extenders 130 that are operably connected to the magnet 120, the vibration generator 102, or both. A vibration extender can assist in distributing vibration from the cask agitator to other areas of a cask 50. In one embodiment, a vibration extender has a proximal end 5 that is operably connected to, and extends away from, the cask agitator. The vibration extender is capable of carrying, conveying, transmitting, or otherwise transferring vibration from the vibration generator to at least one vibration extender magnet 132 located at or about a distal end 10 of the vibration extender. A vibration extender can be configured to contact any area of a cask distanced from the cask agitator, including, but not limited to, a hoop, a head hoop on a chime, sidewall, or another area so as to transmit vibration. The hoop, head hoop, or sidewall can be the same or a different than the one the cask agitator is removably attached to. In one embodiment, a vibration extender has at least one vibration extender magnet 132 at or about the distal end for removable attachment of the vibration extender to a hoop, head hoop, sidewall, or other area at a distance from the vibration generator. FIG. 5 shows several examples of cask agitators with one or more vibration extenders removably attached to a cask utilizing at least one vibration extender magnet.

A vibration extender 130 can comprise any of one more materials capable of transmitting at least some of the vibrations generated by a vibration generator 102. Rigid or semi-rigid materials can be the most beneficial in that regard. The dimensions, such as, for example the length of a vibration extender can also affect the transmission of vibrations. Furthermore, the effective length can depend upon the configuration of the vibration generator, the distance vibrations are transmitted, the shape and material of the vibration extender, and other factors known to those with skill in the art. In one embodiment, at a portion of a vibration extender comprises a metallic material. In a further embodiment, a vibration extender has a length (L) from the proximal end 5 to the distal end 10 of at least about 3", 4", 5", 6", 7", 8", 9", 10", 11", 12", 13", 14" 15", 16", 17" and 18", or a length in a range between any two of the listed values.

Figure 6:
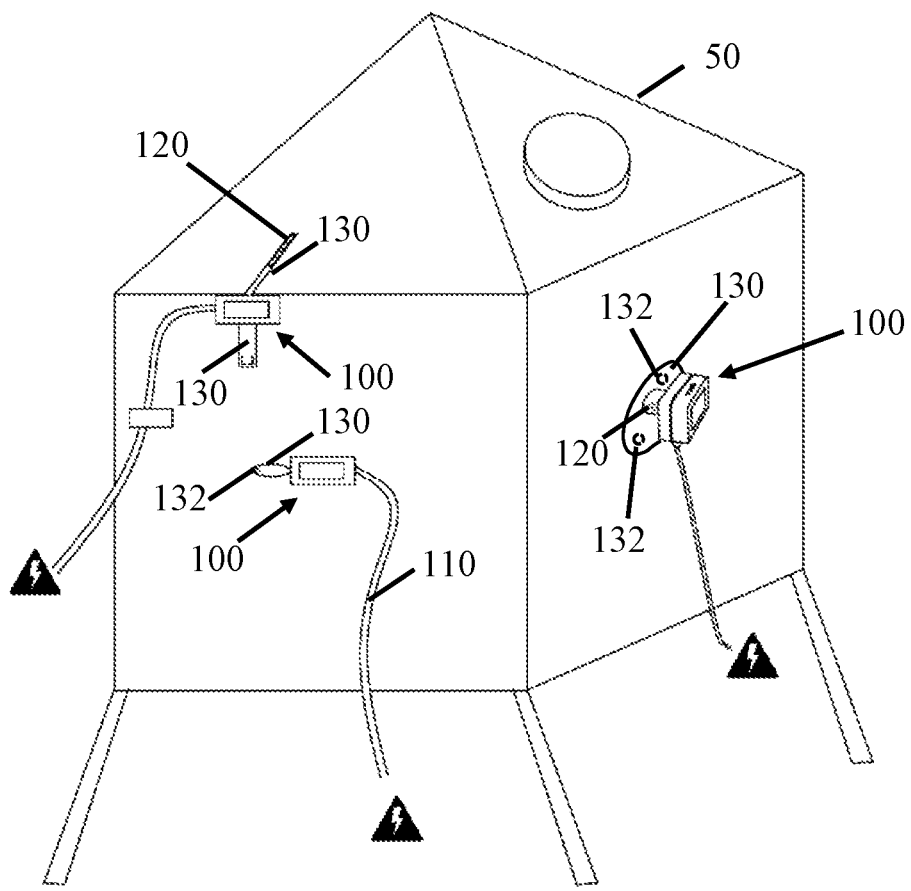
FIG. 6 is an illustration of several embodiments of a cask agitator removably attached to a vat-type cask.

A vibration extender can assume any of a variety of circumferential shapes and can extend in any one or more directions from a cask agitator. FIG. 5 illustrates an elongated vibration extender that has a length that is greater than the wide. FIG. 6 illustrates an embodiment of a round vibration extender that extends around a cask agitator and has multiple vibration extender magnets 132 that assist in attaching the vibration extender to a cask.

The dimensions and weight of a cask agitator 100 can vary depending on the dimensions and weight of the vibration generator 102, the size and strength of the magnet 120, and a variety of other factors known to those of skill in the art. Preferably, the size and weight are such that the cask agitator can be removably attached and supported by the magnet and/or a fastener against a cask component for a desired, sufficient, or pre-determined time. Such desired, sufficient, or pre-determined time can depend upon the cask product and the desired characteristics to be obtained by maturation, but can be between approximately 2 weeks and approximately 10 years. Ideally, a cask agitator can continuously function for at least about 12 months.

In one embodiment, a vibration generator has a width (W) of at least about 2", 3", 4", 5", and/or 6", or a width in a range between any two of the listed values. In a further embodiment, a vibration generator has a height (H) of at least about 2", 3", 4", 5" and/or 6", or a height in a range between any two of the listed values. In a still further embodiment, a vibration generator has a depth (D) of at least about 2", 3", 4", 5", and/or 6" and a depth in a range between any two of the listed values. In a specific embodiment, a vibration generator has a width of approximately 4", a height of approximately 3", and a depth of approximately 3".

In a further embodiment, the weight of the housing portion 109 of a cask agitator, which includes the vibration generator and magnet and/or fastener, can be at least about 2 oz., 4 oz., 8 oz., 12 oz., and 16 oz. or a weight in a range between any two of the listed values. In one embodiment, the housing portion of a cask agitator weighs approximately 6 oz.

A more complete understanding of the invention can be obtained by reference to the following specific example that illustrates a procedure for practicing the subject invention. This example is provided for the purpose of illustration only and should not be construed as limiting. Thus, any and all variations that become evident as a result of the teachings herein or from the following example are contemplated to be within the scope of the present invention.

Example 1: Accelerated Maturation of Red Wine

The ability of a cask agitator to accelerate the maturation process was tested on a cabernet sauvignon wine. The wine was previously batch-aged for 18-months in a stainless-steel vat. The steel-vat aged wine was then transferred to multiple barrel-type casks and one of the casks from the batch was randomly chosen for the experiment. A cask agitator was removably connected to a bilge hoop of the selected test barrel with a 1.25"×0.125" round N52 Neodymium magnet. The cask agitator was operably connected by an electrical cord to a power source that was not in contact with the barrel. The test barrel was treated exactly the same and placed in the same location as the other barrels in the batch containing wine from the same stainless-steel cask. The cask agitator was continuously operated at 60 Hz for approximately twelve months.

About once each month a sample of the test wine was removed from the test barrel and tasted by the vintner to examine the maturation characteristics developing in the test wine. The vintner noticed that as the test wine aged, the tannins became softer and more rounded and there was an improvement in the overall "balance" of the wine. These characteristics are standard hallmarks of quality wines aged for a longer period. After barrel-aging for approximately 12 months, the wine in the barrels from the batch, including test wine in the test barrel, were bottled by the same process.

A blind taste test was conducted with a panel of wine experts and wine enthusiasts. Bottles of the cabernet sauvignon from the batch were taste-tested along with the test wine. It was unanimously determined that the test wine had softer tannins and a more balanced taste and was considered by the panel to be superior to the other bottled wines in the taste test.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

I claim:

1. A cask agitator, configured to be removably attached to a cask, comprising
   at least one magnet with a receiving end and a contact surface;
   one or more vibration generators fixedly attached to the receiving end of the magnet, and
   a vibration extender connected to the at least one magnet and the one or more vibration generators and configured to distribute vibrations from the cask agitator to other areas of the cask such that the vibrations generated by the vibration generator are transmitted to the receiving end, through the at least one magnet, and to the cask through the contact surface.

2. The cask agitator according to claim 1, wherein the contact surface of the magnet is contoured to facilitate contact with a cask.

3. The cask agitator according to claim 1, wherein the vibrations generated by the vibration generator have at least one of intermittent, continuous, and variable frequency.

4. The cask agitator according claim 3, wherein the vibration generator is connectable to an AC or DC electric current.

5. The cask agitator according to claim 4, wherein vibration generator is electromagnetic.

6. The cask agitator according to claim 4, wherein the vibration generator is an offset motor.

7. The cask agitator according to claim 3, wherein the vibration generator is configured to produce the vibrations at a subsonic frequency.

8. The cask agitator according to claim 7,
   wherein the vibration generator is configured to produce the vibrations having a frequency between approximately 30 Hz and approximately 3500 Hz, between approximately 50 Hz and approximately 2500 Hz, or between approximately 75 Hz and approximately 1000 Hz.

9. The cask agitator according to claim 8, wherein the vibrations generated by the vibration generator have a frequency between approximately 30 Hz and approximately 100 Hz, between approximately 50 Hz and approximately 100 Hz, or between approximately 75 Hz and approximately 100 Hz.

10. The cask agitator according to claim 1, further comprising:
    the vibration extender having a proximal end operably connected to the at least one magnet and the vibration generator and a distal end; and
    a vibration extender magnet arranged on or above the distal end.

11. The cask agitator according to claim 1, further comprising a fastener to which the magnet is fixedly attached.

12. A method for accelerating the maturation of a cask product, wherein the method comprises:
    removably attaching at least one cask agitator according to claim 1, to a metallic component of a cask containing the cask product;
    activating the vibration generator to produce vibration at a frequency sufficient to circulate the cask product within the cask; and
    allowing the vibration generator to produce vibration for a pre-determined time.

13. The method according to claim 12, wherein the cask agitator further comprises:
    a vibration extender having a proximal end operably connected to at least one of the magnet and the vibration generator and a distal end; and
    a vibration extender magnet arranged on or about the distal end,
    wherein the method further comprises removably attaching the vibration extender magnet to a metallic component of the cask.

14. The method according to claim 12, wherein the vibration generated by the vibration generator is at least one of intermittent, continuous, and variable frequency.

15. The method according to claim 14, wherein the cask agitator is connectable to an AC or DC electric current and the method comprises connecting the cask agitator to one of AC or DC electric current prior to activation.

16. The method according to claim 15, wherein vibration generator is electromagnetic.

17. The method according to claim 15, wherein the vibration generator is an offset DC motor.

18. The method according to claim 15, wherein the vibration generator produces a subsonic frequency.

19. The method according to claim 12, further comprising a fastener to which the magnet is fixedly attached.

20. The method according to claim 12, wherein the cask product comprises at least one of wine, liquor, and beer.

21. A cask agitator, configured to be removably attached to a cask, comprising at least one magnet with a receiving end and a contact surface;

one or more vibration generators fixedly attached to the receiving end of the magnet;

a vibration extender having a proximal end operably connected to the at least one magnet and the vibration generator and a distal end; and a vibration extender magnet arranged on or above the distal end;

wherein vibrations generated by the vibration generator are transmitted to the receiving end, through the at least one magnet, and to the cask through the contact surface.

* * * * *